United States Patent [19]
Essay, Jr.

[11] Patent Number: 5,622,449
[45] Date of Patent: Apr. 22, 1997

[54] METHOD AND APPARATUS TO CONTROL BEACH AND SAND DUNE EROSION

[76] Inventor: Albert J. Essay, Jr., 403 Highwood Cir., Jupiter, Fla. 33458

[21] Appl. No.: 554,471

[22] Filed: Nov. 7, 1995

[51] Int. Cl.$^6$ .................................................. E02B 3/12
[52] U.S. Cl. .................. 405/19; 404/40; 405/16
[58] Field of Search ................... 405/15–20, 29–35; 404/40

[56] References Cited

U.S. PATENT DOCUMENTS

| | | | |
|---|---|---|---|
| 929,728 | 8/1909 | Taylor | 405/19 |
| 1,112,018 | 9/1914 | McGillivray . | |
| 1,597,114 | 8/1926 | Scott | 405/19 |
| 1,772,821 | 8/1930 | Weber | 404/40 X |
| 1,983,772 | 9/1932 | Pierson . | |
| 2,295,422 | 9/1942 | Neely et al. | 405/19 |
| 2,315,180 | 3/1943 | Arthur | 404/40 X |
| 3,386,252 | 6/1968 | Nelson | 404/40 X |
| 4,152,875 | 5/1979 | Soland | 405/19 X |
| 4,375,928 | 3/1983 | Crowe et al. | 405/20 |
| 4,436,447 | 3/1984 | Crowe | 405/16 |
| 4,486,121 | 12/1984 | Thompson et al. | 405/17 |
| 4,564,311 | 1/1986 | Scales | 405/20 |
| 5,056,956 | 10/1991 | Nicholson | 405/17 |
| 5,370,475 | 12/1994 | LeBlanc | 405/21 |
| 5,380,124 | 1/1995 | Cacossa et al. | 405/16 |

FOREIGN PATENT DOCUMENTS 0052209 5/1981 Japan ................................... 405/16

*Primary Examiner*—Dennis L. Taylor
*Attorney, Agent, or Firm*—Pennie & Edmonds

[57] ABSTRACT

A structure that prevents beach erosion and that builds-up the existing beach and shoreline is disclosed. The structure has a plurality of blocks that are configured into a matrix configuration. Each block has a pair of longitudinal rods extending from the block sides. The longitudinal rods have a hook at a first end and a loop at a second end. The blocks cooperate with each other so that the blocks become flexibly connected by placing the rod hook from a first block into the rod loop of a second and adjacent block. The process is repeated until a matrix is in place covering the area desired. Anchors are attached to the matrix assembly and buried in the sand to keep the matrix configuration in place at the assembly site.

12 Claims, 8 Drawing Sheets

5,622,449

METHOD AND APPARATUS TO CONTROL BEACH AND SAND DUNE EROSION

TECHNICAL FIELD OF THE INVENTION

The present invention relates to preventing beach erosion, and more particularly, to an apparatus that controls and prevents beach erosion and that rebuilds eroded beaches.

BACKGROUND OF THE INVENTION

Beach erosion, or the displacement of sand particles from the beach or shoreline, is a continuing problem for most coastal communities. In many communities the beach is a natural resource that not only stimulates the local economy by attracting tourists and sunbathers, but also is the only barrier between the ocean and homes. Therefore, there is much interest in protecting the existing beach from washing away or eroding, and even to build-up the beach with sand that is migrating from other beaches and being transported by the currents and waves.

The majority of the current beach protection structures that prevent erosion of the beach require that the system be placed at the surface of the beach, which would hinder the enjoyment of the beach, or even prevent the use of the beach altogether. Other structures that are placed below the ground surface require an elaborate assembly of threading continuous cables through the eyelets of a plurality of members.

The disadvantage with these structures is that for a majority of the structures, the cables have to be fed through the blocks as the larger assembly is being constructed at the erosion site. If the site is large, the alignment of the cables with the block openings would become a tedious task, and if the site experienced movement or shifting of the sand, from erosion, currents, or waves at the time of assembly, the alignment required for assembly may be impossible.

What is needed is a structure that protects the beach and shoreline, that is easy to assemble, and that allows the continued enjoyment of the beach while the structure is in place.

DISCLOSURE OF THE INVENTION

It is, therefore, an object of the present invention to provide a structure that protects and retains existing sand at the shoreline of a waterway.

It is also an object of the present invention to provide a structure that helps to build-up the existing shoreline by capturing sand that is migrating in currents, tides, and waves.

It is also an object of the present invention to provide a structure that is to be placed below the existing sand level so that the usage of the beach by sunbathers is not hindered by the structure.

It is also an object of the present invention to provide a structure that allows growth of vegetation through the structure.

It is also an object of the present invention to provide a structure that has a plurality of members wherein the members are easy to assemble directly at the site of erosion.

It is also an object of the present invention to provide a structure that flexes with the shifting of the sand.

It is also an object of the present invention to provide a structure that has a matrix configuration and wherein the matrix may be adapted in size and shape to the particular profile of the erosion site.

It is also an object of the present invention to provide a method of assembling a matrix structure that essentially prevents beach erosion.

According to the present invention, a structure or mat assembly that essentially prevents beach erosion and that builds-up the existing beach and shoreline is disclosed. The structure has a plurality of blocks that are assembled into a matrix configuration made up of rows of blocks. Each block has a pair of longitudinal rods extending from the block. The longitudinal rods have a hook at a first end and a loop at a second end. The blocks cooperate with each other so that the blocks become connected by placing the hook from a block in a first row into the loop of an adjacent block in a second row. The process is repeated until a matrix is in place covering the area desired. Anchors are attached to the mat assembly and buried in the sand to keep the mat assembly in place. The structure may be easily increased or reduced in size by merely adding or subtracting blocks to the existing structure.

The blocks are spaced apart from each other so that the structure is flexible and so that vegetation may grow between the blocks.

In a separate embodiment, a matrix configuration is disclosed that has an arcuate shape relative to on-shore waves that are not parallel with the beach.

The foregoing and other advantages of the present invention will become more apparent from the following description and accompanying drawings.

BEST MODE FOR CARRYING OUT THE INVENTION

According to the present invention, and as shown in FIGS. 1 through 12, a structure, or erosion prevention mat assembly 10 that essentially prevents beach sand and soil erosion and that collects migrating sand is disclosed.

Figure 1:
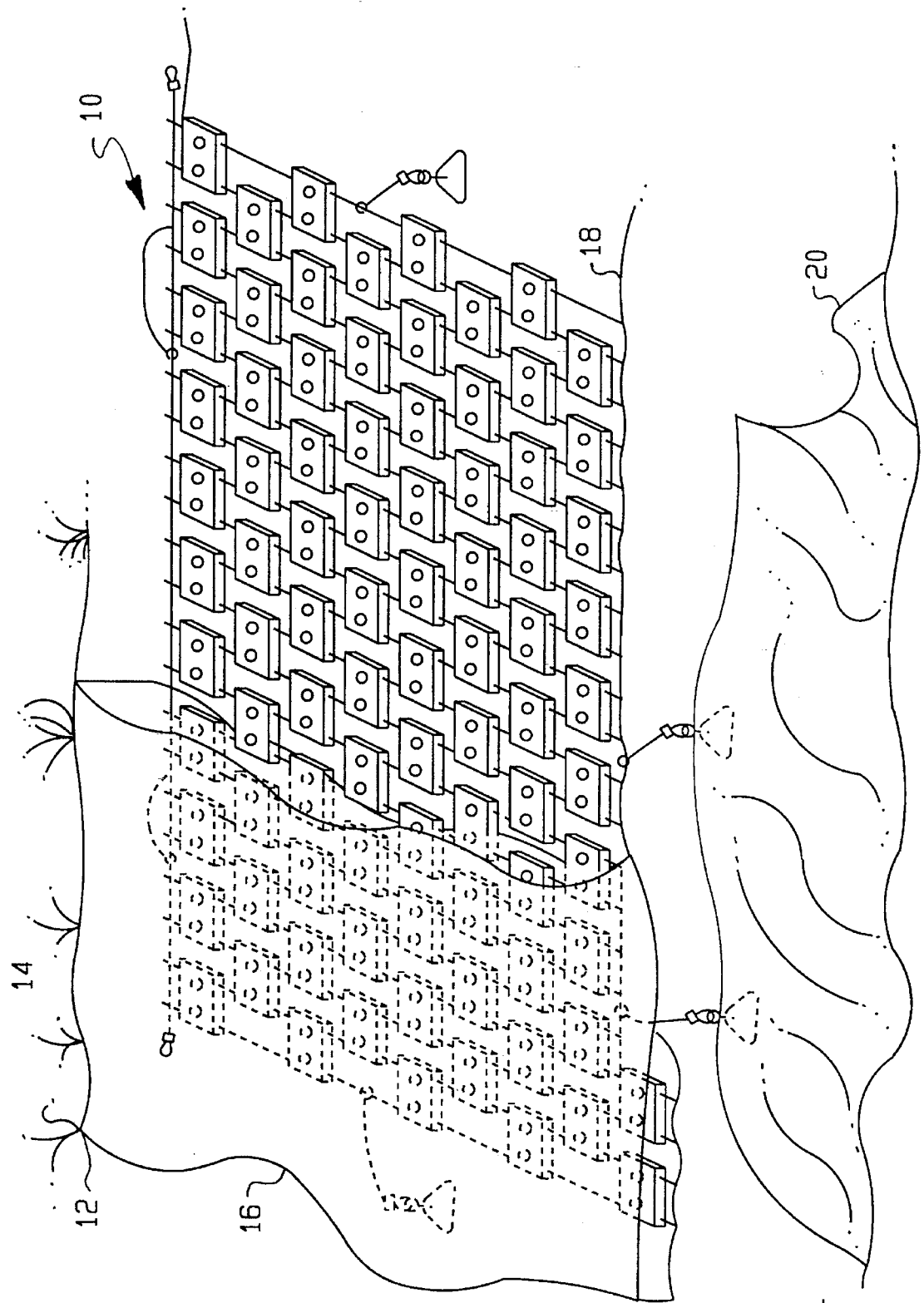
FIG. 1 is a perspective view partially in section of a structure assembly of the present invention installed at a beach.
Figure 2:
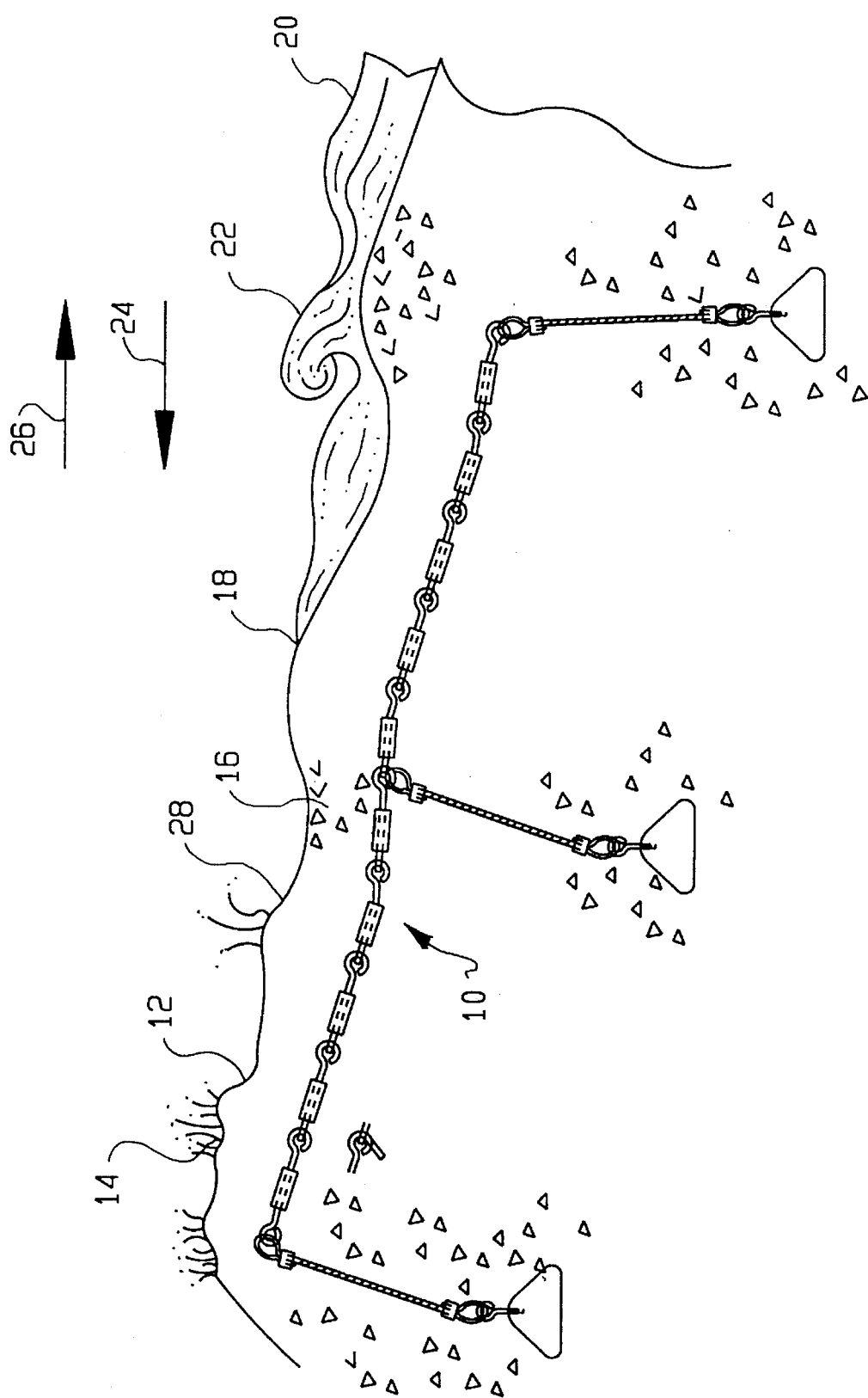
FIG. 2 is a side elevational sectional view of the structure assembly of the present invention installed at the beach.

As shown in FIGS. 1 and 2, the typical beach has a dune 12 located some distance away from the ocean 20 with a water level line 18 with packed sand particles 16 between the dune 12 and the ocean 20. The dune 12 further includes growing vegetation 14, which root structure in the packed sand helps to retain the sand at the dune 12 when high winds, high tides, and rough waves threaten the beach. The tides and waves 22 expose the beach to a constant on-shore force 24 and off-shore force 26, which forces often wash away the sand particles from the beach. As described below, the mat assembly 10 of the present invention will provide a barrier so that the mat assembly 10 will experience the on-shore and off-shore forces 24 and 26 instead of the sand particles and the beach.

As shown in FIG. 2, the mat assembly 10 is designed to be positioned at a predetermined depth beneath the beach surface 28 so that the beach may still be enjoyed by sunbathers while the mat assembly 10 is in place.

Figure 3:
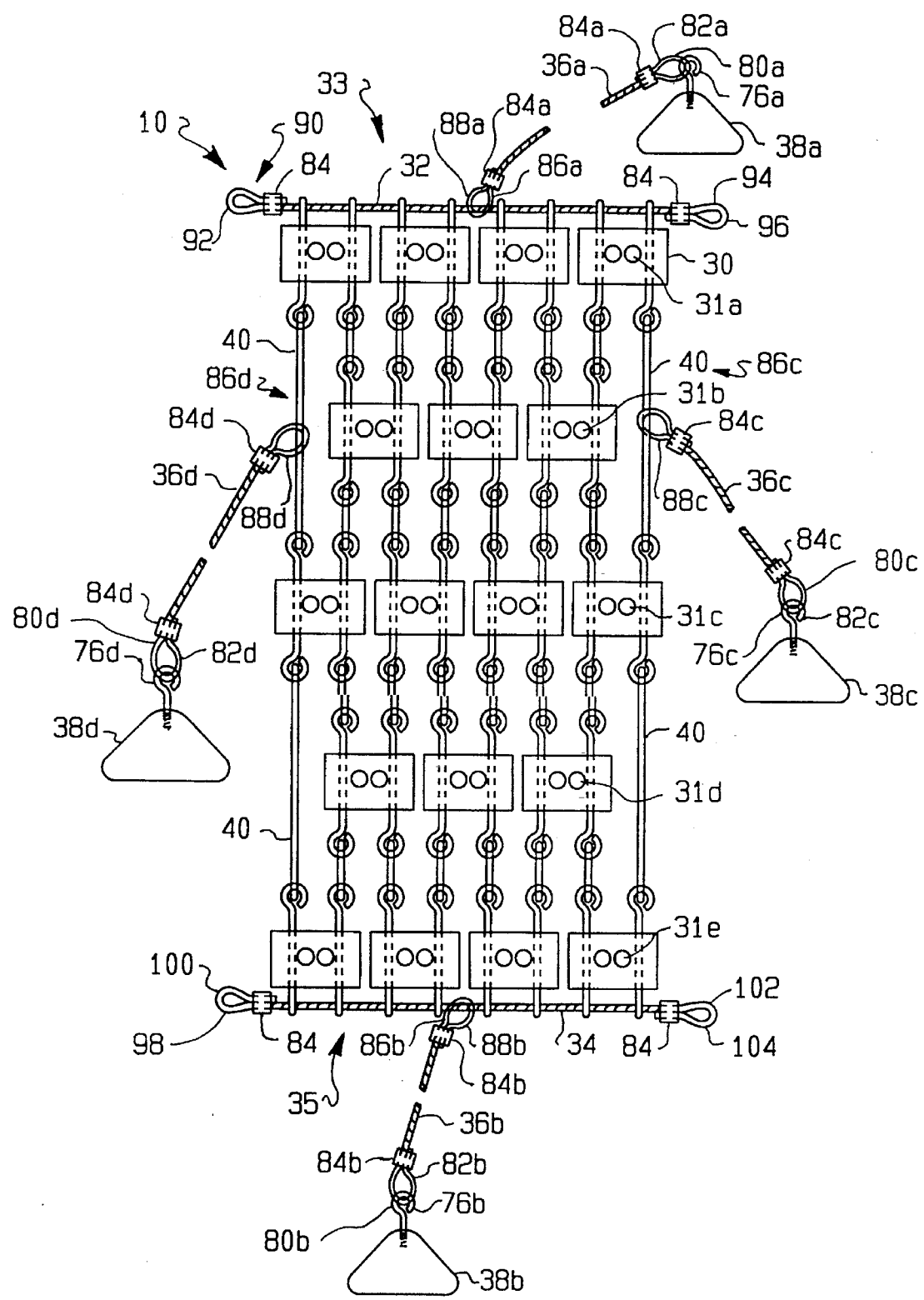
FIG. 3 is a top plan view of the structure assembly of the present invention.
Figure 4:
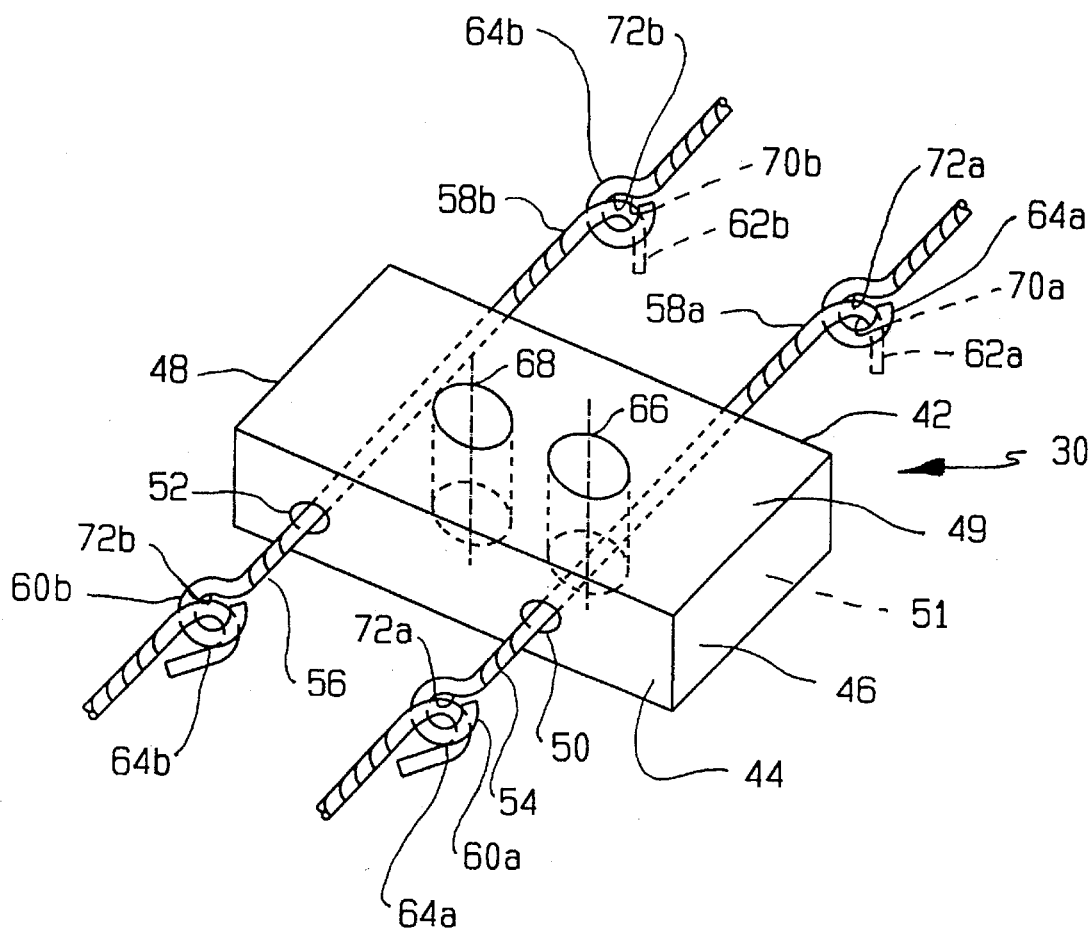
FIG. 4 is a partial perspective view of a block component connected to other block components of the present invention.

As shown in FIG. 3, a plurality of blocks 30 are connected together in rows to make a matrix structure, or mat. As shown in FIG. 4, each block 30 has a first side 42 and an opposite and parallel second side 44, the sides 42 and 44 define the block 30 length. A block first end 46 is perpendicular to the first and second sides 42 and 44, with a second end 48 being opposite and parallel to the first end 46. A first face 49 is opposite a second face 51, so that the sides 42 and 44 together with the ends 46 and 48 and the faces 49 and 51 define a rectangular block configuration.

Each block 30 has a first longitudinal passageway 50, which is parallel to the ends 46 and 48. A second longitudinal passageway 52 is likewise parallel to the first passageway 50 and the ends 46 and 48. Housed in the first passageway 50 is a first longitudinal rod 54. The second passageway 52 houses a second longitudinal rod 56. The first and second longitudinal rods 54 and 56 are more generally known as reinforcement bars, or rebar, which is a ductile material that may be bent a limited amount without experiencing breakage. The longitudinal rods 54 and 56 are integrally cast into the concrete block 30.

The first longitudinal rod 54 has a first end 58a and an opposite second end 60a. The first end 58a extends longitudinally from the first passageway 50 and from the block first side 42. The second end 60a extends from the first passageway 50 and from the block second side 44.

At the longitudinal rod first end 58a, a first end extension or hook 62a extends from the first end 58a at an acute angle. A second end loop 64a extends from the longitudinal rod second end 60a. The second end loop 64a defines a second end passageway 72a. The loop 64a is generally perpendicular to the extension 62a.

Likewise, the second longitudinal rod 56 has a first end 58b and an opposite second end 60b. The first end 58b extends longitudinally from the second passageway 52 and from the block first side 42. The second end 60b extends from the second passageway 52 and from the block second side 44.

At the longitudinal rod first end 58b, a first end extension 62b extends from the first end 58b at an acute angle. A second end loop 64b extends from the longitudinal rod second end 60b. The second end loop 64b defines a second end passageway 72b. The loop 64b is generally perpendicular to the extension 62b.

Each block 30 also has a third passageway 66 and a fourth passageway 68, the passageways 66 and 68 are perpendicular to the block first and second passageways 50 and 52. The third and fourth passageways 66 and 68 are aligned to be parallel with and equal distance between the block first and second sides 42 and 44. The block third and fourth passageways 66 and 68 allow for the growth of vegetation through the blocks while the mat assembly is in place. The block passageways 66 and 68 further allow for drainage of water through the blocks 30, such as while raining, the breaking of waves on the beach, or during high tide. Yet further, the block passageways 66 and 68 give the block 30 an irregular surface, which helps to promote the capture of migrating sand from breaking waves and high tides.

Figure 5:
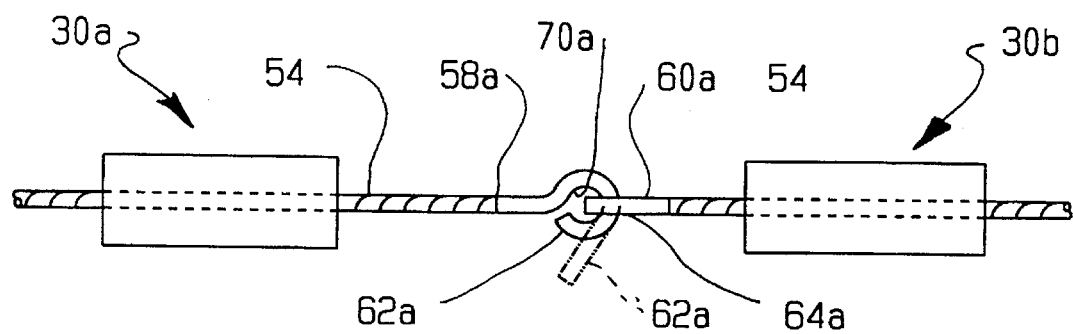
FIG. 5 is a partial side view of the block component connected to other block components of the present invention.
Figure 6:
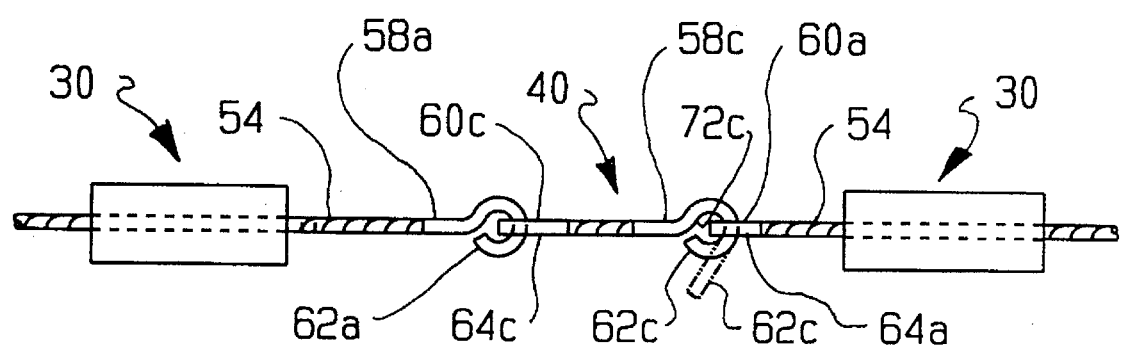
FIG. 6 is a partial side view of two block components connected by a connecting rod of the present invention.

As shown in FIG. 5, the blocks 30 communicate with each other by connection of the longitudinal rods. A first block 30a from one row is positioned adjacent to a second block 30b from an adjacent row. The longitudinal rod first end extension 62a is positioned through the longitudinal rod second end loop 64a and longitudinal rod second end passageway 72a. The longitudinal rod first end extension 62a is deformed to define a longitudinal rod first end passageway 70a, which houses the adjacent longitudinal rod second end loop 64a. After positioning and deforming the longitudinal rod first end extension 62a, the adjacent blocks 30a and 30b are securely, but flexibly, connected together.

As shown in FIG. 4, the typical block 30 is positioned adjacent to another block so that the longitudinal rod first end extensions 62a and 62b may be placed through adjacent longitudinal rod second end passageways 72a and 72b. The extensions 62a and 62b are then deformed to define longitudinal rod first end passageways 70a and 70b for housing longitudinal rod second end loops 64a and 64b.

As shown in FIG. 3, the mat assembly 10 is best configured in a way that each row of blocks 30 are offset by a one half of the length of one block, defined by the length of sides 42 and 44. A plurality of blocks 30 are positioned at the construction site at the dune 12 side of the beach in a lengthwise orientation to define a row 31a. A second row 31b of blocks 30 are positioned adjacent to the first row 31a. The second row 31b is closer to the water level line 18. The second row 31b is offset one half of the length of one block 30, so that a first longitudinal rod 54 of one block 30 of a particular row is connected to a second longitudinal rod 56 of the adjacent row.

The offset matrix configuration gives the mat assembly 10 an irregular surface so that migrating sand may be captured. The mat assembly 10 may be constructed directly at the beach site or may be built in modules with the modules being connected together at the beach site. In addition, the mat assembly 10 size may be built as big or as small as the particular beach site requires, or may be added to or reduced in size depending on the beach erosion or beach build-up at the particular site.

When the mat assembly 10 is configured in an offset matrix as shown in FIG. 3, there is a gap between the blocks at the ends of the mat assembly 10. Therefore, a plurality of block connectors 40 are positioned at the blocks at the ends of the mat where needed. For example, block connectors 40 are shown connecting the end blocks in the first row 31a and the end blocks in the third row 31c. Likewise, block connectors 40 are shown between the end blocks between rows 31c and 31e.

Figure 7:
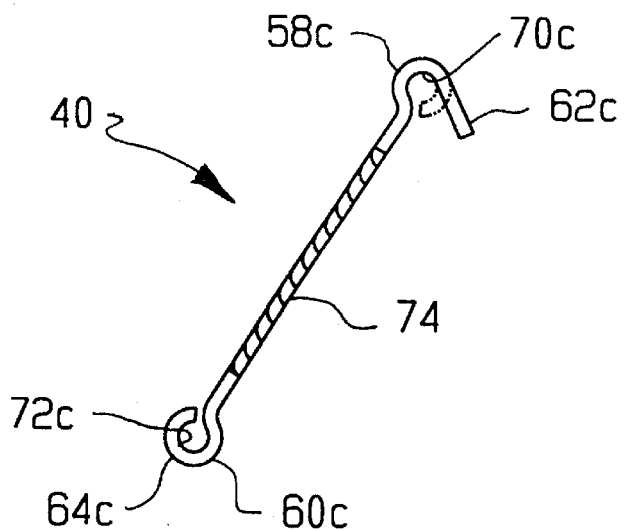
FIG. 7 is a perspective view of the connecting rod of the present invention.

As shown in FIG. 7, the block connectors 40 are similar to the longitudinal rods 54 and 56, in that each block connector 40 has a first end 58c and an opposite second end 60c. The first end 58c extends longitudinally from the second end 60c.

At the block connector first end 58c, a first end extension 62c extends from the first end 58c at an acute angle. When the first end extension 62c is bent into position, locking an adjacent longitudinal rod, the first end extension 62c defines a block connector first end passageway 70c. A second end loop 64c extends from the block connector second end 60c. The second end loop 64c defines a second end passageway 72c. The block connectors 40 and the longitudinal rods 54 and 56 have raised areas 74. The loop 64c is generally perpendicular to the extension 62c.

The mat assembly 10 has a top 33 dune side and a bottom 35 water level side. At the top of the first row 31a, the first and second longitudinal rod first ends 58a and 58b connect to a flexible first mat cable 32. At the bottom of the last row 31e, the first and second longitudinal rod second ends 60a and 60b connect to a flexible second mat cable 34. The flexible cables 32 and 34 are fed through the block longitudinal rods 54 and 56 as the first row 31a of blocks are constructed at the beach site.

Figure 8:
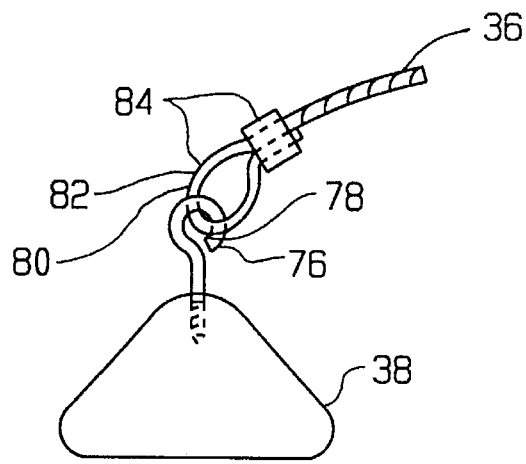
FIG. 8 is side elevational view of an anchor assembly of the present invention.

The cables 32 and 34 are attached to a flexible anchor cable 36. As shown in FIG. 8, the anchor cable 36 is looped through an eye bolt 76 that has an eye bolt passageway 78. The eye bolt 76 is securely fastened to an anchor 38.

Each cable 32 has a first end 80 and a second end 86. The cable first end 80 has a first end loop 82 that passes through the eye bolt passageway 78. A cable coupling 84 securely fastens the cable first end loop 82 to the cable 36.

Figure 9:
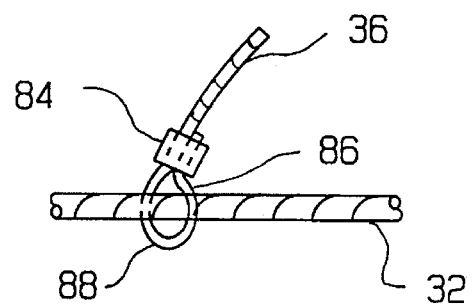
FIG. 9 is a side elevational view of the anchor assembly attached to the structure.

Likewise, as shown in FIG. 9, at the cable second end 86, the cable 36 has a second end loop 88 that loops around the a mat cable 32 or 34, or at the mat lateral sides, may loop around a longitudinal rod 54 or 56, or a block connector 40. The cable second end loop 88 is securely fastened to the cable 36 with a typical cable coupling 84.

Figure 10:
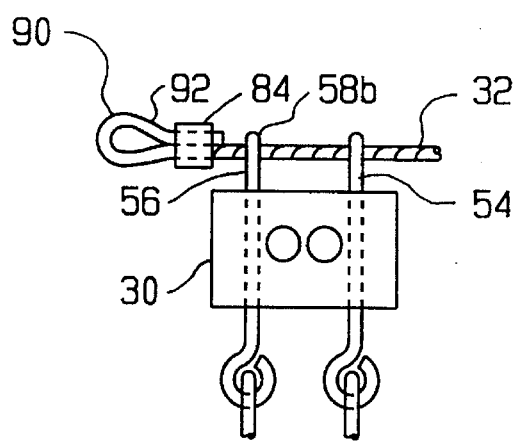
FIG. 10 is a top plan view of the corner of the structure assembly.

As shown in FIGS. 3 and 10, the flexible cable 32 is fed through the longitudinal rods 54 and 56. The longitudinal rod first end extensions 62a and 62b are then bent around the cable 32 so that the longitudinal rods 54 and 56 are securely attached to the cable 32. The cable 32 has a first end 90 and a second end 94. The cable first end 90 is looped through the last longitudinal rod first end 58b defining a cable first end loop 92, so that the loop 92 is laterally positioned from the last longitudinal rod 56. The loop 92 is securely fastened to the cable 32 with a typical cable coupling 84.

The cable second end 94 has a similar configuration as the cable first end 90. The cable second end 94 has a cable second end loop 96 laterally positioned from the last longitudinal rod 54. The loop 96 is securely fastened to the cable 32 with a typical cable coupling 84.

The mat second flexible cable 34 has a first end 98 and a second end 102. The cable first end 98 is fed through the last block longitudinal rod second end 60b. The cable first end 98 has a cable loop 100 laterally positioned from the last longitudinal rod 56. The cable loop 100 is secured to the cable 34 with a typical cable coupling 84.

Likewise, the cable second end 102 is fed through the last block longitudinal rod first end 60a. The cable second end 102 has a cable loop 104 laterally positioned from the last longitudinal rod 54. The cable loop 104 is secured to the cable 34 with a typical cable coupling 84.

As shown in FIG. 3, the anchors 38 are connected to the mat assembly 10 with anchor cables 36. Depending on the mat size, mat configuration, and the beach conditions, the mat assembly 10 may be secured to the packed sand 16 by a plurality of anchors. Typically at least one anchor would be required for each side of the mat assembly.

For the four sided mat assembly 10 shown in FIG. 3, four anchors 38a, 38b, 38c, 38d are attached at the top, bottom, and both lateral sides of the mat assembly 10.

Figure 11:
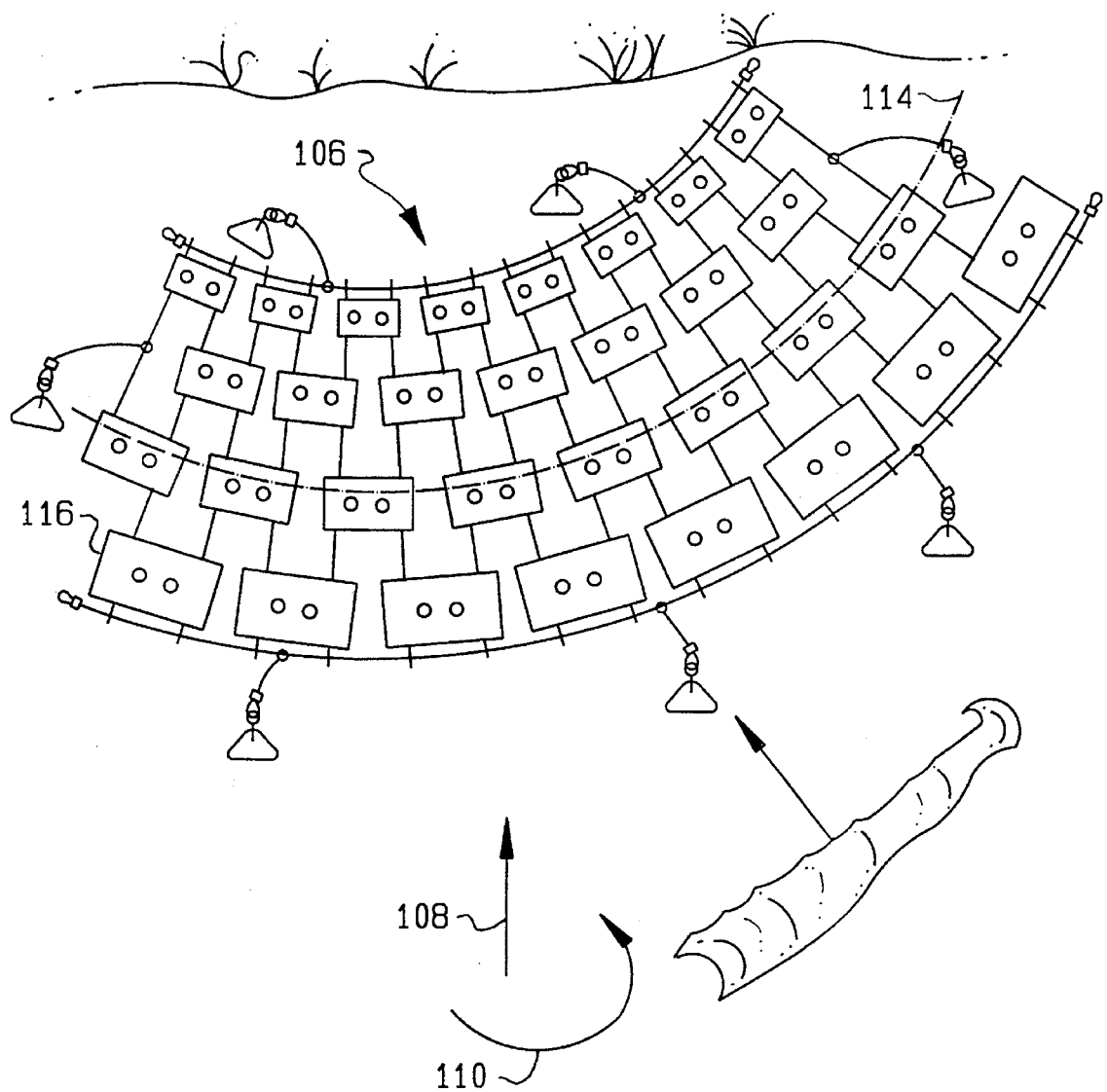
FIG. 11 is a top view of a separate embodiment of a structure assembly of the present invention.

A separate embodiment of a mat assembly 106 of the present invention is shown in FIG. 11. The mat assembly 106 has an arcuate shape that is convex in relation to the direction of the incoming waves. Likewise, the mat assembly 106 could be concave in relation to the direction of the incoming waves, depending on the configuration of the beach. In addition, a plurality of mat assemblies could be positioned on the beach so that a convex assembly is adjacent to a concave assembly, giving the overall assembly an "S" configuration.

Arrow 108 depicts the direction of the on-shore waves, current, winds, and tides. Arrow 110 depicts the rotation of the earth. The combination of the on-shore waves 108 and the rotation of the earth 110 give a resultant on-shore wave direction depicted by arrow 112. The resultant wave direction will vary depending on the location of the beach, such as the whether the beach is located in the northern or in the southern hemisphere. The resultant on-shore wave direction 112 depicts the typical direction of the waves onto the beach in the northern hemisphere.

A distinct advantage of the mat assembly of the present invention is that the mat assembly may be configured in a wide variety of configurations, including a configuration that works in cooperation with the earth's natural forces to accumulate sand particles onto the beach. Another advantage is that the mat assembly is flexible since the components are securely and flexibly connected together.

The mat assembly shown in FIG. 11 has a convex axis 114 in relation to the resultant on-shore waves 112. A plurality of mat assemblies may be constructed at a particular beach site if the erosion covers a wide area. However, most beach communities located in the northern hemisphere realize that a majority of the beach erosion occurs at the south side of port entries or inlets.

Figure 12:
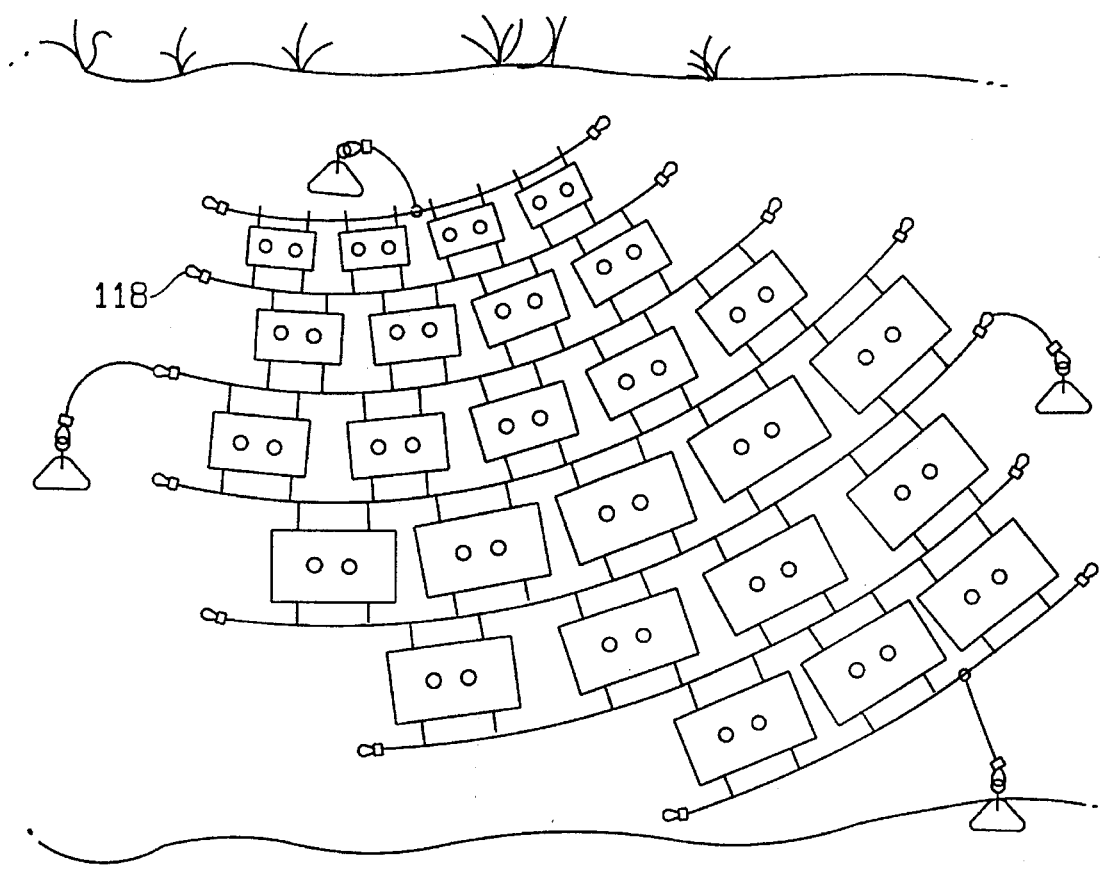
FIG. 12 is a top view of a separate embodiment of a structure assembly of the present invention.

The arcuate mat assembly 106 may utilize incremental longer sized blocks as the rows progress from the dune to the water level line, as shown in FIG. 11. Another alternative is shown in FIG. 12, wherein rows of similarly sized blocks are attached to flexible cables 118 that are positioned between each row of blocks. Therefore, the blocks my be of the same size and configured as an arcuate mat assembly.

Although this invention has been shown and described with respect to a detailed embodiment, those skilled in the art will understand that various changes in form and detail may be made without departing from the spirit and scope of the claimed invention.

I claim:

1. A mat assembly to prevent beach and sand erosion, the mat assembly having a top or dune side and a bottom or water level side, comprising:

a plurality of blocks, the blocks being arranged adjacent to each other lengthwise to form a plurality of latitudinal rows;

at least two rods extending longitudinally from each block, the rods having a rod first end and a rod second end, the rod first end extending from the block toward the mat top side, and the rod second end extending from the block toward the mat bottom side, the rod first end having an extension, the rod second end having a loop with a loop passageway, the rod extensions of one row communicating with the loop passageways of an adjacent row so that the blocks are flexibly connected;

a first mat cable extending through the rod extensions at the top row;

a second mat cable extending through the rod loop passageways at the bottom row;

at least one anchor being attached to the mat assembly, the anchor being buried in the sand or soil.

2. The mat assembly of claim 1, wherein each block further comprises:

a first side, a second side being parallel to the first side, a first end being perpendicular to the first and second sides, and a second end being parallel to the first end, a first face being perpendicular to the ends and sides and a second face being parallel to the first face so that the sides, ends and faces define a rectangular block with the distance between the ends defining each block length.

3. The mat assembly of claim 1, wherein the alignment of the blocks in one latitudinal row are offset latitudinally in relation to the blocks in the adjacent latitudinal row.

4. The mat assembly of claim 1, wherein the longitudinal rod extension includes a loop communicating with the adjacent longitudinal rod loop so that the blocks are flexibly connected together.

5. The mat assembly of claim 1, wherein each block has a first passageway and a second passageway, the passageways being parallel with each other and with the block first and second ends, the longitudinal rods extending through the passageways.

6. The mat assembly of claim 5, wherein each block further has a third passageway and a fourth passageway, the third and fourth passageways being parallel with each other and aligned to be parallel with the block first and second sides.

7. The mat assembly of claim 1, wherein the latitudinal rows are arcuate in shape.

8. The mat assembly of claim 7, wherein the latitudinal rows are convex or concave in shape in relation to incoming waves.

9. A mat assembly to prevent beach and sand erosion, the mat assembly having a top or dune side and a bottom or water level side, comprising:

a plurality of blocks, the blocks being arranged adjacent to each other lengthwise to form a plurality of latitudinal rows, the latitudinal rows having a top row, a bottom row, and at least one middle row;

at least two rods extending longitudinally from each block, the rods having a rod first end and a rod second end, the rod first end extending from the block toward the mat top side, and the rod second end extending from the block toward the mat bottom side, the rod first end having a first loop with a first loop passageway, the rod second end having a second loop with a second loop passageway;

a top mat cable extending through the first loop passageways at the top row;

a bottom mat cable extending through the second rod loop passageways at the bottom row;

a connecting row cable between each latitudinal row of blocks, the middle row longitudinal rod first ends and second ends being connected to one of the connecting row cables;

at least one anchor being attached to the mat assembly, the anchor being buried in the sand or soil.

10. The mat assembly of claim 9, wherein the alignment of the blocks in one latitudinal row are offset latitudinally in relation to the blocks in the adjacent latitudinal row.

11. The mat assembly of claim 9, wherein each block further has at least one through passageway for the growth of vegetation and drainage of water.

12. The mat assembly of claim 9, wherein the latitudinal rows are convex or concave in shape in relation to incoming waves.

* * * * *